United States Patent [19]

Abt et al.

[11] Patent Number: 4,965,668

[45] Date of Patent: Oct. 23, 1990

[54] ADAPTIVE ROUNDER FOR VIDEO SIGNALS

[75] Inventors: John Abt, Nevada City; James A. Delwiche, Grass Valley, both of Calif.

[73] Assignee: The Grass Valley Group, Inc., Nevada City, Calif.

[21] Appl. No.: 433,882

[22] Filed: Nov. 9, 1989

[51] Int. Cl.$^5$ .......................... H04N 5/14; H03M 1/20
[52] U.S. Cl. ....................................... 358/160; 358/37; 358/133; 358/138; 358/166; 341/131
[58] Field of Search ................. 358/160, 37, 166, 138, 358/133, 22, 183; 341/131

[56] References Cited

U.S. PATENT DOCUMENTS

| | | | |
|---|---|---|---|
| 4,652,832 | 3/1987 | Jasper | 364/721 |
| 4,654,695 | 3/1987 | Fling | 358/133 |
| 4,727,506 | 2/1988 | Fling | 364/724.03 |
| 4,764,748 | 8/1988 | Geen et al. | 341/131 |
| 4,845,498 | 7/1989 | Kubo et al. | 341/131 |
| 4,893,316 | 1/1990 | Janc et al. | 341/110 |

*Primary Examiner*—John W. Sheppard
*Assistant Examiner*—Michael D. Parker
*Attorney, Agent, or Firm*—Francis I. Gray

[57] ABSTRACT

An adaptive rounder for avoiding truncation errors for digital video signal has a dither source that is modified by the bits of an integer portion of an input digital signal corresponding to the video signal. A dither signal from the dither source has a number of bits equal to a fractional portion of the input digital signal. The dither signal is added to the input digital signal and the result is truncated to produce an output digital signal having a number of bits equal to the integer portion.

6 Claims, 3 Drawing Sheets

ADAPTIVE ROUNDER FOR VIDEO SIGNALS

BACKGROUND OF THE INVENTION

The present invention relates to digital rounding techniques, and more particularly to an adaptive rounder for video signals that introduces a dither signal only when there is a rounding error, the dither signal being a fixed grid for "freeze frame" inputs but random during changing inputs, and being filtered to remove components at the subcarrier frequency for composite input video signals.

Digital processing of video signals often results in an increase in dynamic range, i.e., an increase in the number of bits representing a video sample. This increased number of bits usually is reduced at some point to control costs and/or to meet digital interconnection standards. Straight truncation or rounding of the digital signal at the output of a video processing module often introduces objectionable correlated errors. For example, rounding off signals such as flat fields or ramps may produce a low frequency correlated error to which the eye is particularly sensitive. The introduction of a dither signal randomizes the correlated error and reduces its effect. Although the magnitude of the error in the dithered output is greater as compared to simple rounding, the randomness of the error results in a perceived improvement.

But there are still problems with this method. First the addition of the dither signal reduces the signal to noise ratio of the digital signal all of the time, even when conditions are such that there is no correlated error and the dither signal is really not needed, i.e., when the processing module is not processing and only passing through the signal. Second the dither signal may have components at the subcarrier frequency of a composite video signal that introduces objectionable chrominance noise, which noise is particularly noticeable when processing monochrome video with no chrominance content. Finally dithering a signal that originates in a fixed source and is subject to a fixed processing operation, such as a static frame buffer input to a fixed gain stage, results in temporal noise, i.e., pixels that were constant in time are now changing from frame to frame as a result of the dither. This problem is somewhat subjective, but it is desirable that a freeze frame input to a fixed processing operation remain "frozen". The use of a fixed dither grid, random within a frame but the same from frame to frame, solves this problem, but such a fixed dither grid accumulates linearly in successive processing operations, which is also undesirable.

FIG. 1 illustrates a prior art basic dithering technique without rounding that is disclosed by N. S. Jayant and Peter Noll in "Digital Coding of Waveforms" published by Prentice-Hall, Inc. in 1984. An input signal x(n) is input to an adder together with a dither signal from a dither source, and the output is then quantized to produce an output signal y(n).

One method for rounding down the number of bits in a digital video signal to reduce the visibility of quantization errors over simple truncation is an error feedback technique as described in an article by M. G. Croll, et al of the British Broadcasting Corporation entitled "Accommodating the Residue of Processed or Computed Digital Video Signals within the 8 Bit CCIR Recommendation 601." The input video signal of m-bits is input to an adder together with the (m-t) least significant bits of the output of the adder. The t most significant bits are output to other video devices, with the lowest order bit being affected by the carry from the addition of the accumulated least significant bits of the input signal.

Another method is disclosed in European Patent Application Publication No. 0,270,259 A2 assigned to Quantel Limited entitled "Improvements Relating to Video Signal Processing Systems." To reduce an m-bit signal to an t-bit signal, the least significant (m-t) bits are input to a comparator together with the output of a random number generator. If the (m-t) bits are greater than the random number generated, then the most significant bits are incremented by one. Otherwise the most significant bits are not altered.

What is desired is an adaptive rounder that applies dither only when required, applies a fixed grid dither when the input signal is frozen and a random dither when the input signal is changing, and does not introduce objectionable chrominance noise when the input signal is a composite video signal.

SUMMARY OF THE INVENTION

Accordingly the present invention provides an adaptive rounder for a video signal that introduces a dither signal only when there is a rounding error, applies a fixed grid dither signal for freeze frame inputs but a temporally random dither signal for changing inputs, and for a composite video signal filters the dither signal to remove components at the subcarrier frequency. An input digital signal having an integer portion and a fractional portion is applied to one input of an adder. A random number generator generates a fixed dither signal that repeats at a data frame rate. The fixed dither signal is input to a scrambler. Also input to the scrambler is the integer portion of the input digital signal. The dither signal from the scrambler is applied directly to the other input of the adder at the fractional bit portion so that zero is added to the integer portion of the input digital signal and the dither signal is added to the fractional portion. Alternatively when the input digital signal is a composite digital video signal, then the dither signal is input first to a chrominance notch filter before being applied to the adder input. The output of the adder is truncated to the integer portion of the input digital signal to provide a rounded output digital signal.

The objects, advantages and other novel features of the present invention are apparent from the following detailed description when read in conjunction with the appended claims and attached drawing.

DESCRIPTION OF THE PREFERRED EMBODIMENT

Figure 1:
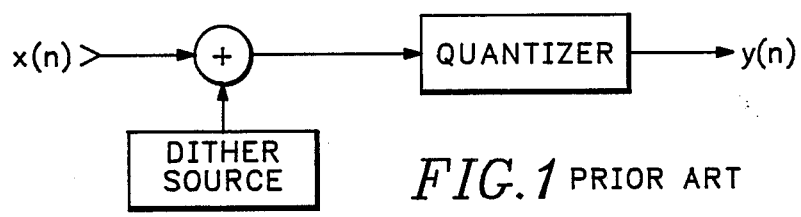
FIG. 1 is a block diagram of a prior art dithering technique.
Figure 2:
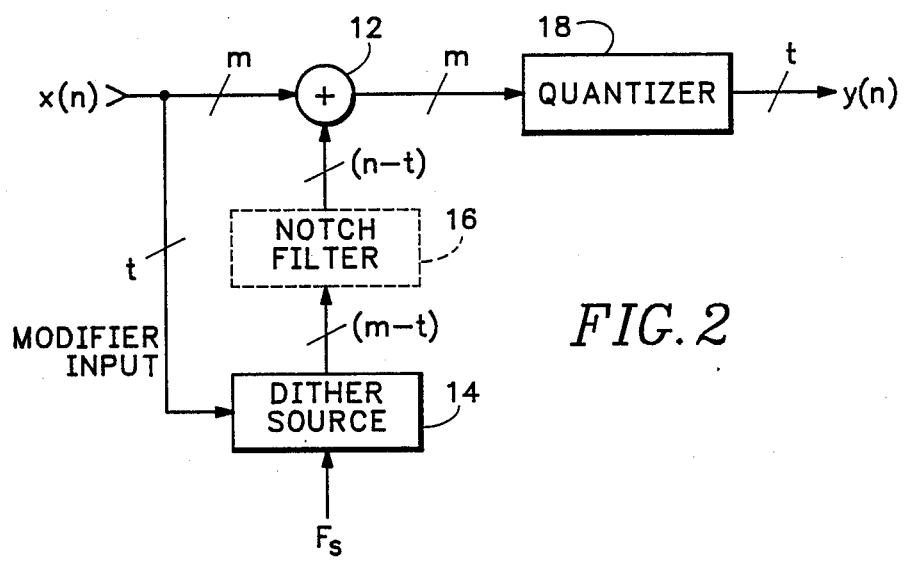
FIG. 2 is a block diagram of an adaptive rounder for a composite video signal according to the present invention.

Referring now to FIG. 2 an input digital signal x(n) having m bits is input to an adder 12. The input digital signal has t integer bits and (m-t) fractional bits. For example, to round a ten-bit digital signal to an eight-bit digital signal, m=10 and t=8. The t integer bits act as a modifier input to a dither source 14 that outputs an (m-t)-bit dither signal. A frame pulse, Fs, also is input to the dither source 14. The dither source 14 outputs the same value for the same modifier input at the same pixel location, but random values with the same modifier input at different pixel locations within a frame. The dither signal is input to an optional notch filter 16 when the input digital signal represents a composite video signal to filter out any components of the dither signal that occur at the chrominance subcarrier frequency $f_{sc}$. The dither signal is then input to the adder 12 for combination with the (m-t) fractional bits of the input digital signal. The resulting output is the m-bit input digital signal as modified by the dither signal. If the fractional portion of the input signal is zero, i.e., no rounding is necessary, then there is no carryover to the integer portion of the input signal and the integer portion is passed through a quantizer 18 unchanged. Due to the chroma notch filter 16 when the input digital signal is a composite video signal, no chrominance components are added to the input digital signal by the dither signal. Finally if the input digital signal is a freeze frame, i.e., the pixels of the frame remain the same from frame to frame, the dither source for any particular pixel in the frame is addressed by the same modifier value from frame to frame to produce the same dither signal for that pixel from frame to frame. If the input digital signal is varying from frame to frame, then the modifier value for a given pixel varies from frame to frame to vary the dither signal. Thus the dither signal is a fixed grid signal for freeze frames and a random signal for changing frames.

Figure 3:
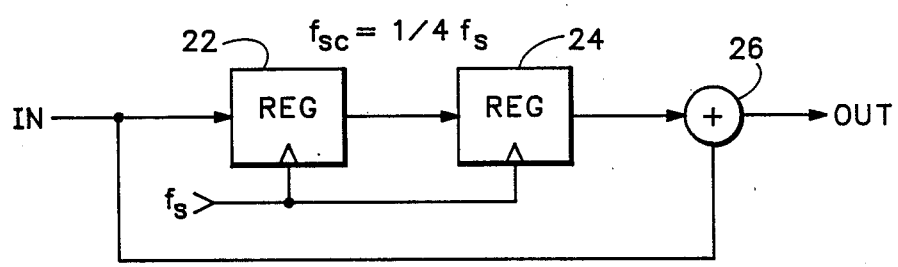
FIG. 3 is a block diagram of a notch filter for the adaptive rounder of FIG. 2.

The notch filter 16 may be implemented as shown in FIG. 3. The dither signal is input to a first register 22 clocked at the sample frequency $f_s$, where $f_{sc}=4f_s$, and also to a summing circuit 26. The output of the first register 22 is clocked into a second register 24 at the next clock pulse of $f_s$, and the output is input to the summing circuit 26. The output of the summing circuit is the combination of alternate samples, i.e., ⅓, 2/4, 3/5, etc. The effective result is to eliminate at the output or the notch filter 16 any components of the input that occur at $f_{sc}$.

Figure 4:
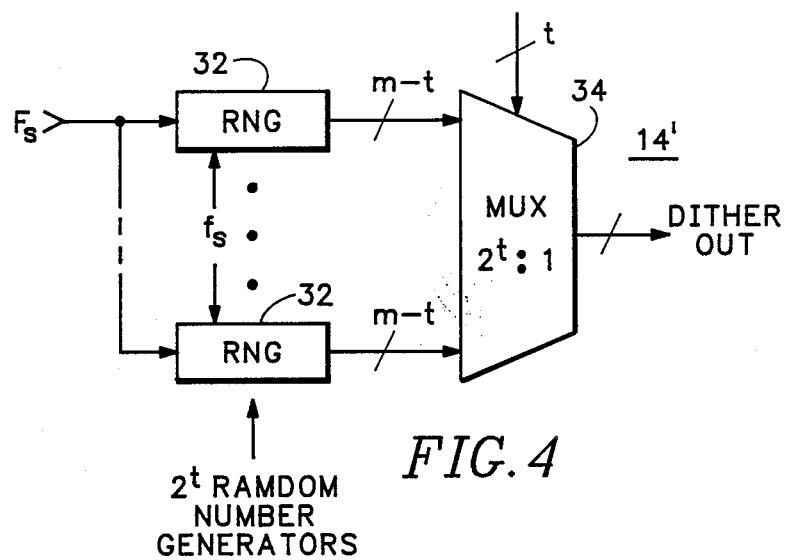
FIG. 4 is a block diagram of a theoretical dither source for the adaptive rounder of FIG. 2.

A theoretical dither source 14' appropriate for the adaptive rounder is shown in FIG. 4. In this circuit there are $2^t$, or 256 in the case of t=8, random number generators 32, each of which generates a fixed grid signal at the sample rate $f_s$ that repeats at a data frame rate for the input digital signal, since the random number generators are reset by a frame sync pulse. The respective grid signals are random with respect to each other, however. The outputs of the random number generators 32 are input to a multiplexer 34. The multiplexer 34 is addressed by the integer portion of the input digital signal at the pixel, or sample, rate $f_s$ so that the output of the multiplexer presents as the dither signal the output of a different one of the random signal generators 32 for each pixel according to the integer portion of that pixel. In this manner each pixel position of a freeze frame selects the same random number generator 32 during each frame time, resulting in the desired fixed dither grid signal. A changing input digital signal is subject to a temporally random grid signal as the changing pixels in a given temporal position select different ones of the random number generators 32.

Figure 5:
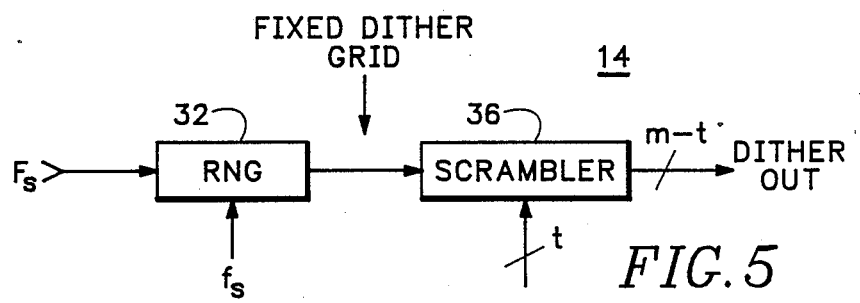
FIG. 5 is a block diagram of a practical dither source for the adaptive rounder of FIG. 2.

The dither source 14 of FIG. 5 is a practical hardware implementation of the theoretical dither source 14' of FIG. 4. There is a single pseudo-random number generator 32 that produces a fixed dither grid signal repeated at a frame rate. The modifier input goes to a scrambler circuit 36 rather than to a multiplexer. The scrambler circuit 36 changes the output of the random number generator 32. If the scrambling operation is deterministic, i.e., the same inputs always produce the same output, a freeze frame input results in a fixed dither grid signal at the output as desired. Likewise a changing input digital signal changes the dither grid signal by altering the scrambling operation.

Figure 7:
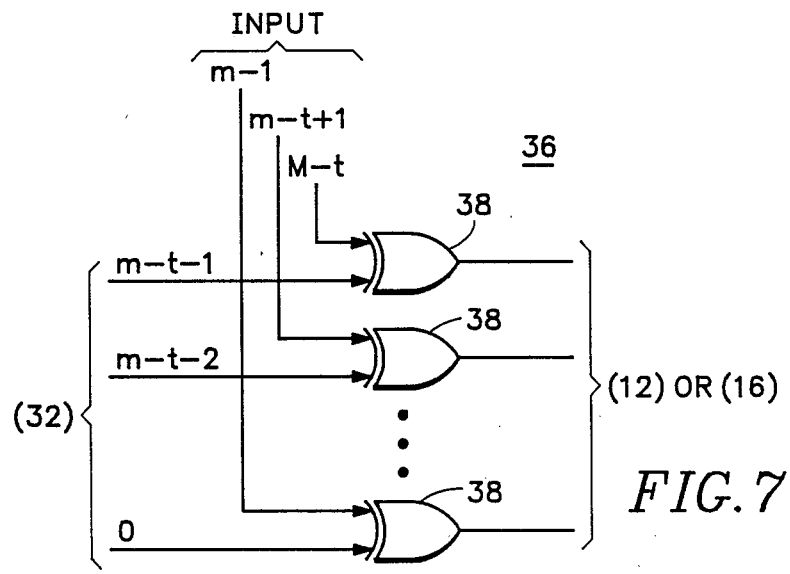
FIG. 7 is a schematic diagram of a scrambler for the adaptive rounder of FIG. 6.
Figure 6:
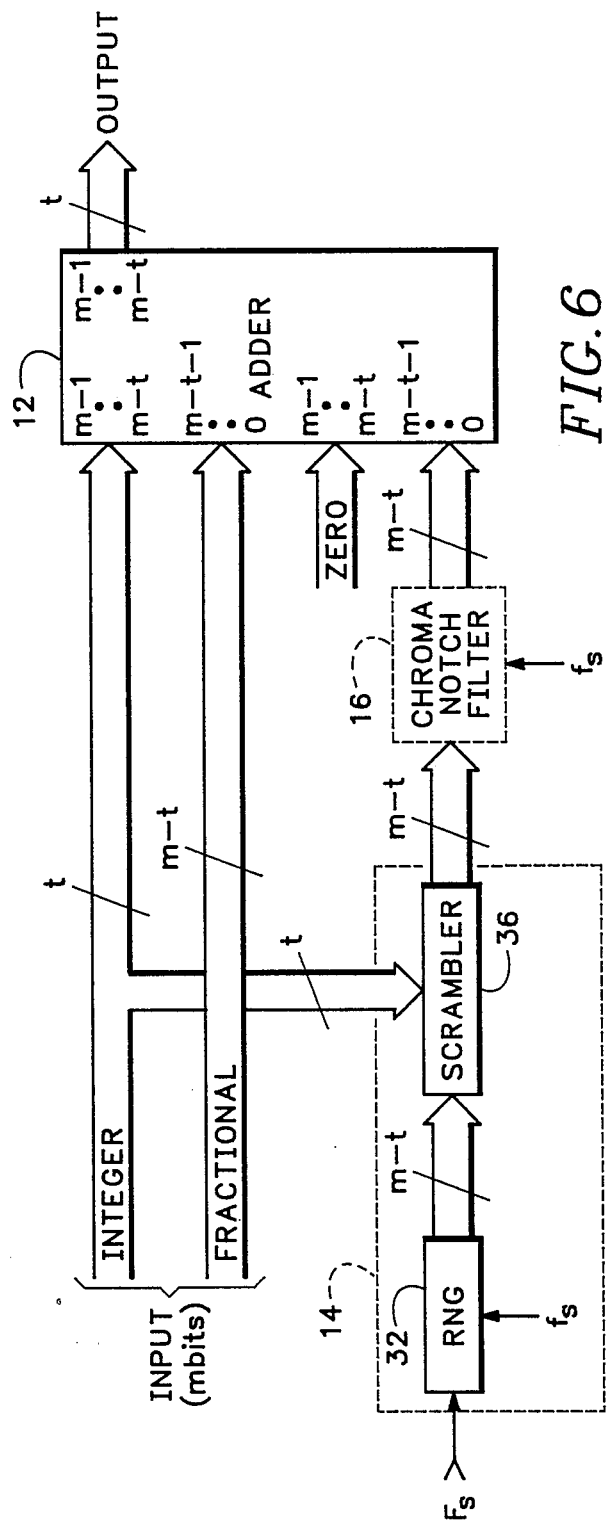
FIG. 6 is a schematic diagram of the adaptive rounder of FIG. 2.

As shown in greater detail in FIG. 6 the m-bit input digital signal is applied to one input of the adder 12, with bits 0 through (m-t-1) representing the fractional portion and bits (m-t) through (m-1) representing the integer portion. At the other input of the adder 12 a zero is input to the integer portion (m-t) through (m-1) and the dither signal from the notch filter 16 is input to the fractional portion 0 through (m-t-1) The output from the adder 12 represents the t integer bits (m-t) through (m-1), truncating the fractional portion bits 0 through (m-t-1). As shown in FIG. 7 the scrambler 36 may be a plurality of exclusive OR gates 38, each having as an input one of the (m-t) bits from the random number generator 32 and one of the t bits from the integer part of the input digital signal. These bits are input to the XOR gates 38 in such a manner that the least significant integer bits from the input digital signal scramble the most significant dither bits from the random number generator. Thus for the situation where the dither signal has two bits, D0,D1, and the integer part of the input digital signal has eight bits, I0-I7, then bit I1 is input to one of the XOR gates 38 to scramble bit D0 and bit I0 is input to the other XOR gate to scramble D1, only two XOR gates being required in the scrambler 36.

Thus the present invention provides an adaptive rounder for video signals that introduces a dither signal that is added only to the fractional part of the input digital signal, the dither signal being in the form of a fixed dither grid for a freeze frame input signal and a random dither grid for a changing input signal. For a composite video input signal the dither signal is notch filtered at the subcarrier frequency so that the dither signal does not add a color component to the processed input signal.

What is claimed is:

1. An adaptive rounder for reducing the number of bits between an input digital signal and an output digital signal comprising:
    means for generating a dither signal having a number of bits equal to the difference in the number of bits between the input and output digital signals, the dither signal being a function of a modifier input signal derived from the input digital signal; and
    means for combining the dither signal with the input digital signal to produce the output digital signal.

2. An adaptive rounder as recited in claim 1 wherein the input digital signal is a composite video signal further comprising means for filtering the dither signal prior to input to the combining means to remove components of the dither signal at a subcarrier frequency of the composite video signal.

3. An adaptive rounder as recited in claim 1 wherein the generating means comprises:
 a random number generator that is reset for each frame of the input digital signal to produce a fixed grid dither signal; and
 means for scrambling the fixed grid dither signal when the input signal is changing to produce a random dither signal as the dither signal.

4. An adaptive rounder as recited in claim 3 wherein the scrambling means comprises a plurality of exclusive OR gates, each having as one input one of the bits of the fixed grid dither signal and as another input one of the bits of the input digital signal, the output of the exclusive OR gates being the dither signal.

5. An adaptive rounder as recited in claims 4 wherein the least significant bits of the input digital signal are combined with the most significant bits of the fixed grid dither signal in the plurality of exclusive OR gates to produce the dither signal.

6. An adaptive rounder as recited in claim 1 wherein the generating means comprises:
 a plurality of random number generators, one for each of the possible bit combinations for the output digital signal, each random number generator outputting a fixed grid dither signal; and
 means for selecting one at a time the random number generators for output to produce the dither signal, the random number generator selected being a function of the value of the bits of the input digital signal corresponding to the bits of the output digital signal.

* * * * *